(No Model.)

H. C. BAILEY.
ADJUSTABLE SPLIT PULLEY.

No. 403,901. Patented May 28, 1889.

WITNESSES.
Gustav Bohn.
E. B. Griffith.

INVENTOR.
Henry C. Bailey.
By C. P. Jacobs
Atty.

N. PETERS, Photo-Lithographer, Washington, D. C.

UNITED STATES PATENT OFFICE.

HENRY C. BAILEY, OF EDINBURG, INDIANA.

ADJUSTABLE SPLIT PULLEY.

SPECIFICATION forming part of Letters Patent No. 403,901, dated May 28, 1889.

Application filed January 17, 1889. Serial No. 296,677. (No model.)

*To all whom it may concern:*

Be it known that I, HENRY C. BAILEY, of Edinburg, county of Johnson, and State of Indiana, have invented certain new and useful Improvements in Adjustable Split Pulleys; and I do hereby declare that the following is a full, clear, and exact description thereof, reference being had to the accompanying drawings, in which like letters refer to like parts.

My invention relates to that class of pulleys which are divisible, commonly known as "split" pulleys, and will be understood from the following description.

Figure 1:
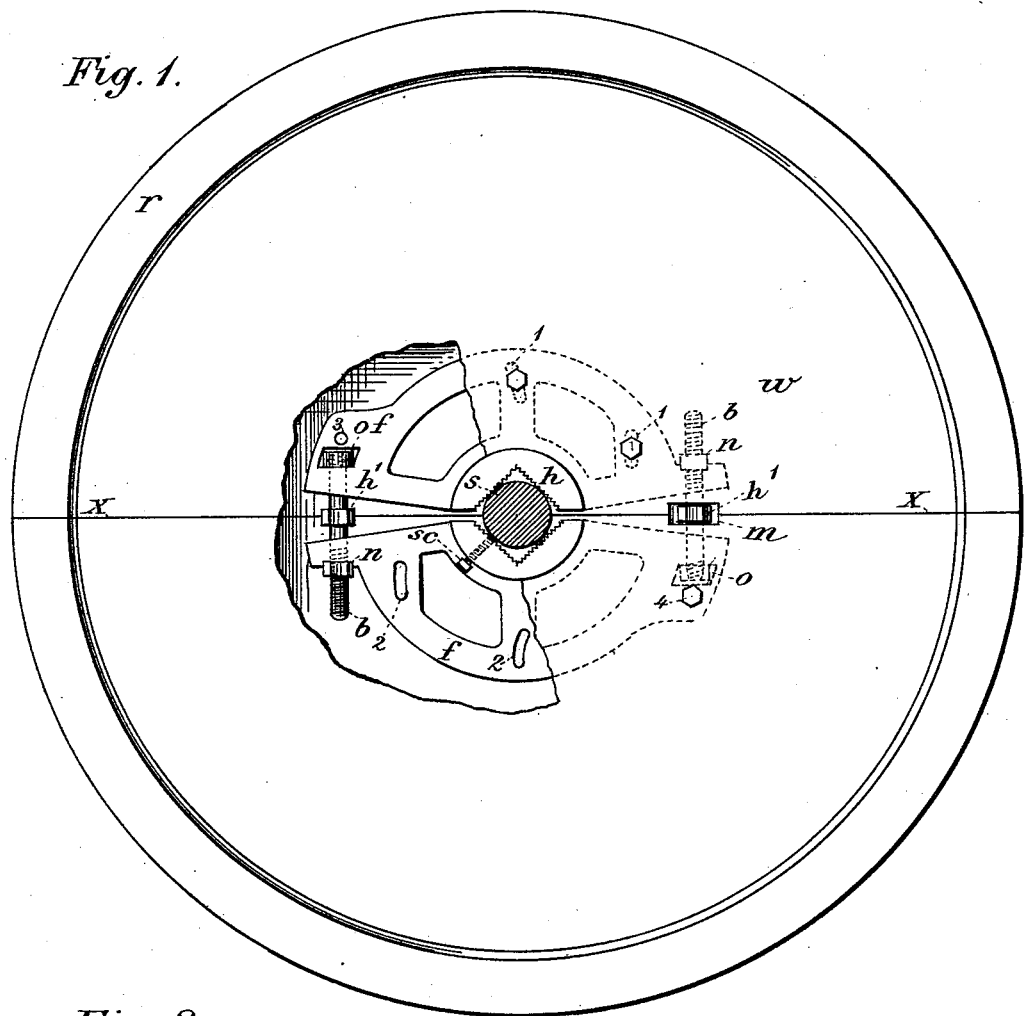
Figure 2:
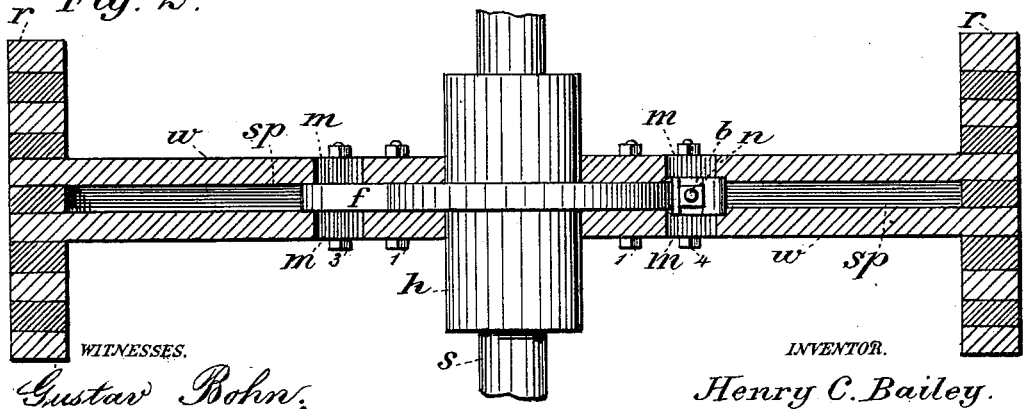

In the drawings, Figure 1 is a side view of my device, a part of the web being broken away to show the adjusting mechanism. Fig. 2 is a top view of the adjusting mechanism, one-half of the pulley being removed.

The pulley is made of wood having a rim, $r$, and a web, $w$. This web is formed of two thicknesses of wood with a space, $sp$, between, as shown in Fig. 2, and in this space is located the adjusting mechanism connected with the hub $h$, which is inserted in a round opening in the halves of the web in the usual manner. The hub is formed of two halves, each of which is provided with semicircular flanges $f$. Lugs or projections are formed upon the ends of these flanges, one to admit the passage of the bolt $b$, upon which the nut $n$ is screwed, and the other projection being wider and having greater strength and solidity, has an opening to receive the upper end of the bolt $b$, and a recess or opening, $o$, at right angles to the line of the bolt, in which is inserted the nut intended to form the head of this bolt.

About midway of this bolt a secondary head, $h'$, is formed, being six-sided, and by applying a wrench to this bolt through the mortises $m$ in the sides of the web, the center of these mortises being along the line of the two parts of the web, this bolt may be turned so as to draw the two flanges upon the sections of the hub together.

It will be observed that while the hub and flange sections are formed alike, yet in operation the similar ends are located opposite each other, as shown in Fig. 1. These flanges fit down into the space or recess between the parts of the web, as shown in Fig. 2, and are held in place by bolts passing through slots 1 and 1 and 2 and 2, and through the holes 3 and 4. The slots 1 and 1 and 2 and 2 permit the travel of the bolt, so that in adjusting the hub to different-sized shafts the bolts can be tightened and the flanges drawn together without any resistance from the securing-bolts that pass through the slots of the flanges, these slots being made of sufficient length to permit the required adjustment.

The opening in the hub-section is square and preferably corrugated, as shown, as these corrugations give a better grip upon the periphery of the shaft $s$, and the shaft-openings in the hub may thus be made to accommodate shafts of varying diameters.

In addition the set-screw $sc$ may be tapped through the hub, as shown in Fig. 1, when it is desired to hold it more firmly to the shaft. It will be seen, therefore, that by means of the flanges on the hub-sections and the bolts which connect the same the parts may be drawn together, so as to lock closely to shafts of different sizes without causing any strain upon the web and rim portions of the pulley, inasmuch as these are always fitted closely upon the line $x\ x$, and there is no strain brought upon the surface of the web or rim during the process of adjusting the hub-sections to the shaft.

What I claim as my invention, and desire to secure by Letters Patent is the following, viz:

1. A pulley comprising two sections, the web provided with a central open space, the hub formed of two parts, each part provided with a semicircular flange fitting into corresponding central spaces formed in the web, and means connecting such flanges for uniting the hub-sections and clamping them upon the shaft, substantially as shown and described.

2. A split pulley comprising two sections, the web formed so as to leave an open space between its parts, the hub formed in two sections, each section having integral therewith a semicircular flange adapted to enter the space formed in the web and secured to the web by bolts passing through slots to admit of the parts of the hub being drawn together without any strain upon the pulley-sections, such hub being provided with a shaft-opening having a corrugated surface for gripping the shaft, and means—such as bolts—for drawing the flanges of the hub together and clamping the hub-sections to the shaft, substantially as shown and described.

3. A split pulley comprising two sections, its web having a central recess formed therein to admit the hub-flanges, a hub formed in two sections, each one provided with a flange for entering the recess in the web, and with projections formed on the ends of the flanges, having threaded openings to receive bolts for clamping the hub-sections together, and having squared openings formed in the hub-sections for admitting the shaft, all combined substantially as described.

In witness whereof I have hereunto set my hand this 4th day of January, 1888.

HENRY C. BAILEY.

Witnesses:
C. P. JACOBS,
E. B. GRIFFITH.